(12) United States Patent
Lau et al.

(10) Patent No.: US 9,859,767 B2
(45) Date of Patent: Jan. 2, 2018

(54) ELECTRIC MOTOR

(71) Applicant: Johnson Electric S.A., Murten (CH)

(72) Inventors: James Ching Sik Lau, Hong Kong (CN); Siu Kin Tam, Hong Kong (CN); Hua Ping Zeng, Shenzhen (CN); Yuk Wai Elton Yeung, Hong Kong (CN)

(73) Assignee: Johnson Electric S.A., Murten (CH)

( * ) Notice: Subject to any disclaimer, the term of this patent is extended or adjusted under 35 U.S.C. 154(b) by 372 days.

(21) Appl. No.: 14/747,466

(22) Filed: Jun. 23, 2015

(65) Prior Publication Data

US 2015/0372569 A1 Dec. 24, 2015

(30) Foreign Application Priority Data

Jun. 23, 2014 (CN) .......................... 2014 1 0284342

(51) Int. Cl.
*H02K 11/02* (2016.01)
*H02K 5/14* (2006.01)
*H02K 11/026* (2016.01)
*H02K 13/00* (2006.01)

(52) U.S. Cl.
CPC ........... *H02K 5/148* (2013.01); *H02K 11/026* (2013.01); *H02K 13/006* (2013.01)

(58) Field of Classification Search
CPC ........ H02K 5/14–5/148; H02K 11/026; H02K 13/006
See application file for complete search history.

(56) References Cited

U.S. PATENT DOCUMENTS

| | | | | |
|---|---|---|---|---|
| 7,843,105 B2 * | 11/2010 | Grimm | ................ | H02K 5/148 29/592.1 |
| 2001/0017495 A1 * | 8/2001 | Sato | ........................ | H02K 5/15 310/67 R |
| 2007/0278877 A1 * | 12/2007 | Winkler | ............... | H02K 11/026 310/72 |
| 2010/0141068 A1 * | 6/2010 | Silva | .................... | H02K 11/026 310/72 |

\* cited by examiner

*Primary Examiner* — Ramon M Barrera

(74) *Attorney, Agent, or Firm* — Muncy, Geissler, Olds & Lowe, P.C.

(57) ABSTRACT

An electric motor has an end cap assembly having a ground connection. The motor has a housing, a brush assembly including brushes, electrical components and a terminal holder, an end cap, and a ground plate. The brush assembly is secured in an open end of the housing. The end cap is positioned on an outer side of the brush assembly and fixed to the housing. The ground plate is disposed between and is resiliently compressed by the brush assembly and the end cap. The plate includes a plurality of elastic structures. Each elastic structure resiliently bears against corresponding leads of at least some of the electrical components. The ground plate is electrically connected to at least one of the housing and the end cap to accomplish a ground connection.

18 Claims, 11 Drawing Sheets

ELECTRIC MOTOR

CROSS REFERENCE TO RELATED APPLICATIONS

This non-provisional patent application claims priority under 35 U.S.C. §119(a) from Patent Application No. 201410284342.0 filed in The People's Republic of China on Jun. 23, 2014, the entire contents of which are hereby incorporated by reference.

FIELD OF THE INVENTION

This invention relates to electric motors and in particular, to an end cap assembly having a ground connection.

BACKGROUND OF THE INVENTION

Brush type electric motors generate electromagnetic radiation during commutation. Electromagnetic radiation causes electromagnetic interference (EMI) in nearby electronic devices. Typically, a motor housing is grounded to decrease the EMI transmitted to other electric devices and filters are added to suppress the EMI. A typical grounding connection structure of a motor, as shown in FIG. 1, includes electrical components mounted on one side of the terminal holder. The components include two inductors L1', L2' and two grounding resistors R1', R2' respectively connected to the inductors L1', L2' by a corresponding terminal One lead of the grounding resistor R1' and one lead of the grounding resistor R2' are connected with the terminals. The other lead of the grounding resistor R1' and the other lead of the grounding resistor R2' extend into slots in a periphery of the terminal holder and extend to the other side of the terminal holder. During assembly, the terminal holder is first arranged in the motor housing, and then the end cap is connected to the housing. After that, the other lead of the grounding resistor R1' and the other lead of the grounding resistor R2' rest on the inner surface of the end cap and electrically connect to the end cap to achieve the ground connection. FIG. 1 shows a schematic circuit diagram of the grounding connection. The inductors L1', L2' are connected between the positive and negative brushes and the motor terminals, and the motor is grounded via the grounding resistors R1', R2'.

The method of connecting the resistors to the motor housing by pinching the leads between the terminal holder and the housing and/or between the motor housing and the end cap results in deformation of the housing and/or the end cap with undesirable effects on the motor especially as designers try to increase the motor efficiency of the motor and to increase the power density of the motor. Also, due to relative movement between the parts, the electrical connection can become unstable in high temperature and high vibration environments.

Also, manufacturing tolerance of the housing, the terminal holder and the end cap may lead to an unreliable electric connection and a failure of the ground connection of the motor.

SUMMARY OF THE INVENTION

Hence there is a desire for an electric motor having an end cap assembly with a ground connection which is reliable under high temperature and dramatic vibration environment.

Accordingly, there is provided an electric motor, comprising: a housing having an open end; and an end cap assembly closing the open end of the housing, the end cap assembly comprising: a brush assembly comprising a terminal holder and electrical components disposed on the terminal holder; an end cap positioned on an outer side of the terminal holder and secured to the housing; and a ground plate installed between the terminal holder and the end cap, the plate being electrically connected to at least one of the housing and the end cap and comprising at least one resiliently deformable structure bearing against a lead of at least one of the electrical components to electrically connect said lead to the housing or end cap.

Preferably, the plate comprises a main body and a plurality of claws extending from the main body, the claws being configured as the resiliently deformable structures, each claw has one end connected to the main body, and an opposite free end extending obliquely away from the end cap, which elastically bears against the corresponding lead of the respective electrical component.

Preferably, the plate further comprises at least one tongue, at least part of the tongue protrudes away from the terminal holder to form a bent portion, the bent portion protruding beyond the surface of the terminal holder to resiliently bear against the end cap.

Preferably, the bent portion is configured to have an inverted V shape or inverted U shape.

Preferably, the plate further comprises an foot extending from the main body, with a free end bent to electrically connect to the housing.

Preferably, the plate electrically connects to the end cap, and the electrical components comprise at least one inductor and at least one grounding resistor or capacitor.

Preferably, the electrical components comprise first and second inductors, first and second grounding resistors, first and second grounding capacitors, and a bridging capacitor, the bridging capacitor being connected across positive and negative terminals of the motor, the resiliently deformable structures respectively bearing against corresponding ground leads of the first and second grounding resistors and the first and second grounding capacitors.

Preferably, first and second connectors are disposed in the terminal holder, the first and second inductors and grounding resistors being positioned on an inner side of the terminal holder facing the housing, the first and second grounding capacitors and the bridging capacitor being positioned on an outer side of the terminal holder facing the end cap.

Preferably, a first receiving portion is defined in the outer side of the terminal holder for matching the configuration and routing of the first and second grounding capacitors, a second receiving portion is defined in the outer side of the terminal holder for accommodating the bridging capacitor, and first and second receiving grooves are defined in the outer side of the terminal holder for accommodating corresponding leads of the first and second grounding resistors; and wherein the first and second grounding capacitors are received in the first receiving portion, and the bridging capacitor is received in the second receiving portion.

Preferably, one lead of the first grounding resistor connects to the first terminal, a second lead is inserted through the terminal holder and extends to the outer side of the terminal holder to contact the bottom surface of the first receiving groove; wherein one lead of the first grounding capacitor contacts the bottom surface of the first receiving portion, a second lead is inserted through the terminal holder and extends to the inner side of the terminal holder to connect to the first terminal; wherein one lead of the second grounding resistor connects to the second terminal, and a second lead is inserted through the terminal holder and extends to the outer side of the terminal holder and bends to contact the bottom surface of the second receiving groove; wherein one lead of the second grounding capacitor contacts the bottom surface of the first receiving portion, and a second lead is inserted through the terminal holder and extends to the inner side of the terminal holder to connect with the second terminal; and wherein one lead of the bridging capacitor is inserted through the terminal holder and extends to connect to the first terminal, and a second lead of the bridging capacitor is inserted through the terminal holder and extends to connect to the second terminal Preferably, a third receiving portion is defined in the terminal holder, in which the plate is received.

Preferably, positioning posts are formed in the terminal holder, and corresponding first positioning holes are defined in the plate, the positioning posts being inserted through the first positioning holes.

Preferably, a first bulge is formed at the center of the plate facing the terminal holder, and a first recess portion is defined in the terminal holder for receiving the first bulge.

Preferably, a second recess portion is defined in the plate corresponding to the first bulge, a second bulge is formed on the end cap corresponding to the second recess portion, and second positioning holes are defined in the end cap corresponding to the positioning posts of the terminal holder; and wherein the second bulge is aligned with and received in the second recess portion of the plate, and the positioning posts of the terminal holder are disposed in the second positioning holes of the end cap, respectively.

Preferably, notches are defined in the open end of the housing, and corresponding lugs are formed on the terminal holder, the lugs being disposed in the notches.

Preferably, a plurality of tenons extends axially from the open end of the housing, and a plurality of mortises is defined in the end cap corresponding to the tenons of the housing, the tenons extend through the mortises and are deformed to fix the end cap to the housing.

Preferably, a plurality of first support portions extends radially outwards from a circumferential periphery of the open end of the housing, a first through hole is defined in the center of each first support portion, a plurality of second support portions is formed on the end cap corresponding to the first support portion, and a second through hole is defined in each second support portion corresponding to the first through hole for receiving a fastener to secure the motor to a device.

Preferably, a plurality of openings is defined in the first support portion, and a plurality of protrusions is formed on the end cap, the protrusions being disposed in the openings to position the end cap relative to the housing.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
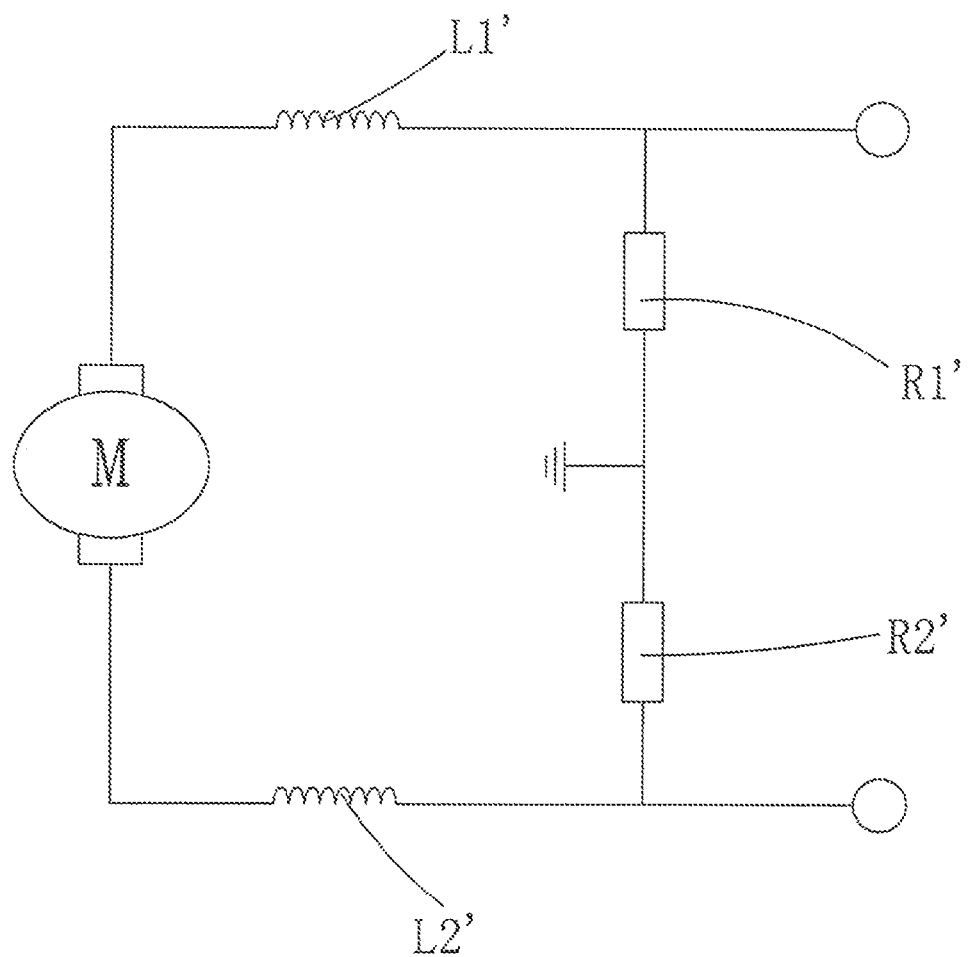
FIG. 1 is a schematic circuit diagram of a ground connection used in a prior art motor.
Figure 2:
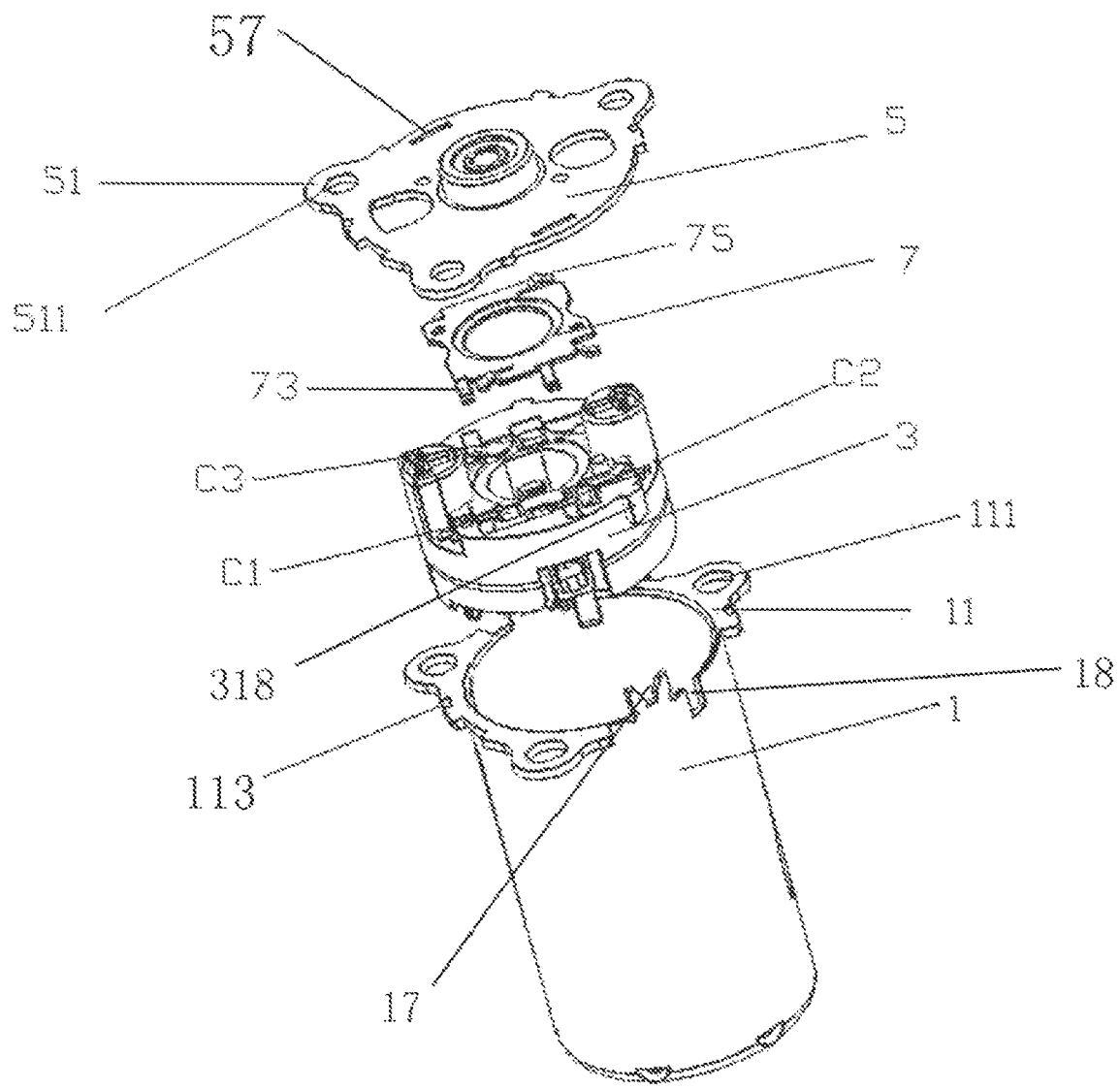
FIG. 2 is an exploded view of an electric motor having a ground connection according to the preferred embodiment of the present invention.
Figure 3:
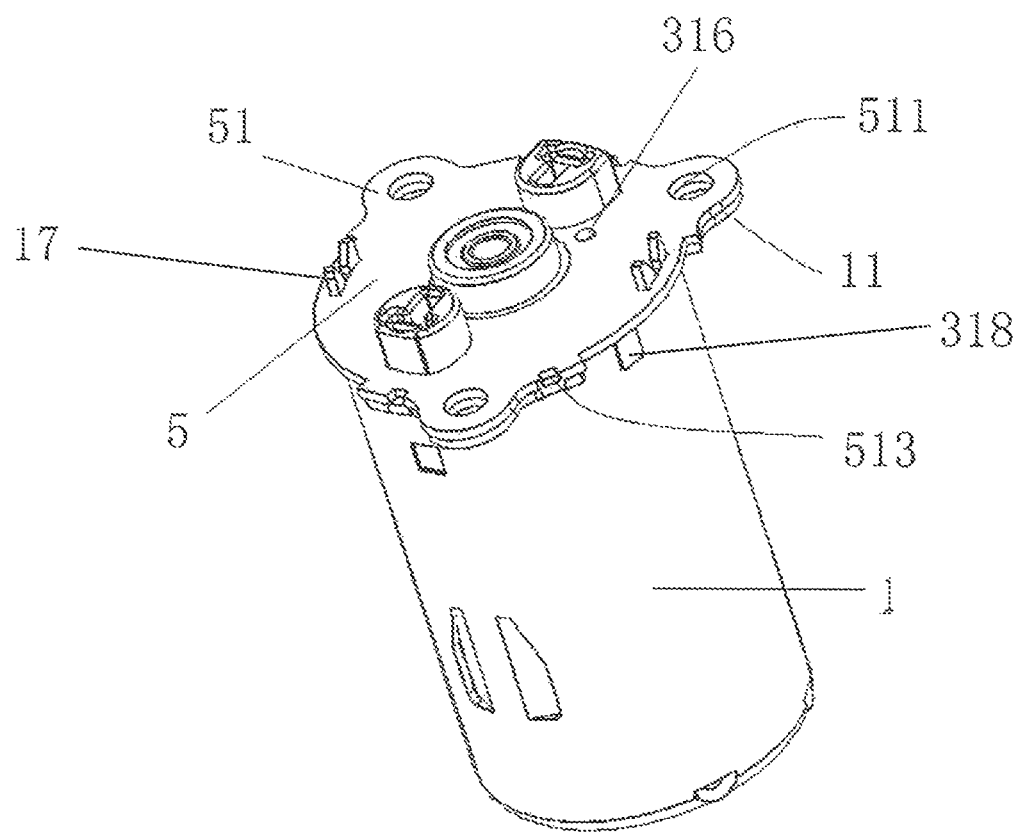
FIG. 3 is an assembled view of the motor of FIG. 2.

Referring to FIGS. 2 to 12, a motor having an end cap assembly with a ground connection in accordance with the preferred embodiment includes a housing 1, a brush assembly 3 installed at an open end of the housing 1, an end cap 5 positioned at an outer side of the brush assembly 3 and secured onto the housing 1, and a plate 7 secured between the brush assembly 3 and the end cap 5.

In the present embodiment, the housing 1, the end cap 5 and the plate 7 are made of a metal material with high electrical conductivity. The housing 1, the end cap 5 and the plate 7 can also be made of other suitable material such as non-metallic material with high electrical conductivity. Preferably the housing 1 is made of a magnetically conductive material so that the housing forms at least part of the return flux path of the stator.

Specifically, the housing 1 is substantially cylindrical in shape with one end open and the other end closed. A plurality of notches 18 are formed in the open end for matching lugs 318 formed on the brush assembly 3 to thereby support the brush assembly 3. A plurality of tenons 17 extend from the open end along the axial direction for matching mortises 57 defined in the end cap 5 to thereby secure the end cap 5 to the housing 1. In the present embodiment, each tenon 17 is substantially V-shaped. A plurality of first supporting portions 11 extend radially outwardly from a periphery of the open end. A first through hole 111 is defined in each first supporting portion 11 for allowing a fastener such as a bolt to extend there through. Openings 113 are also defined in the first supporting portions 11 for matching protrusions 513 (see FIG. 3 and FIG. 9) formed on the end cap 5.

Figure 4:
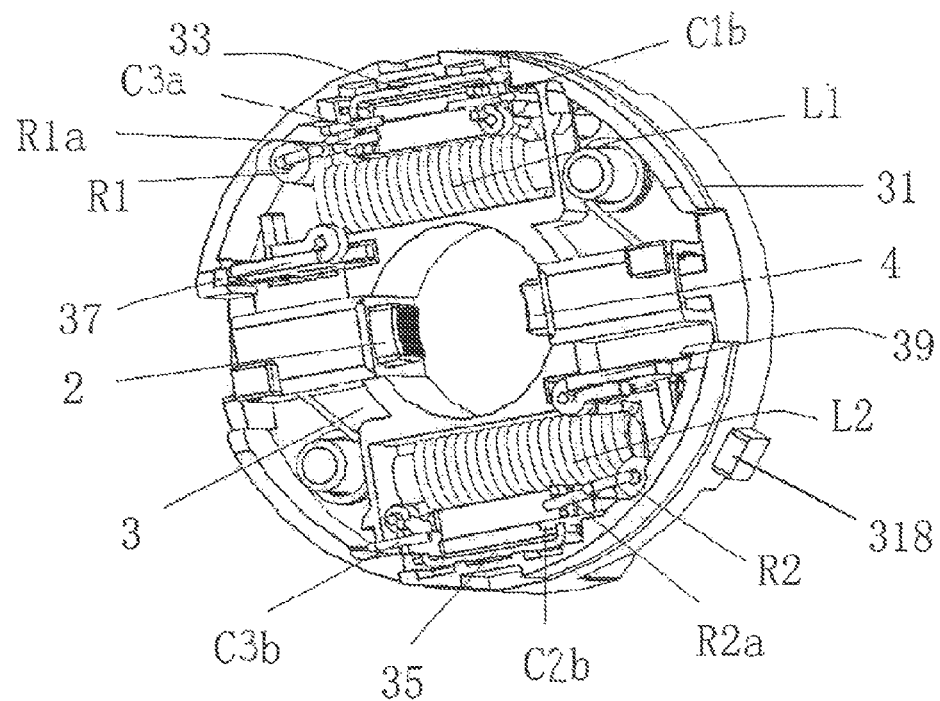
FIG. 4 shows a brush assembly of the motor of FIG. 2, viewed from the inner side.
Figure 5:
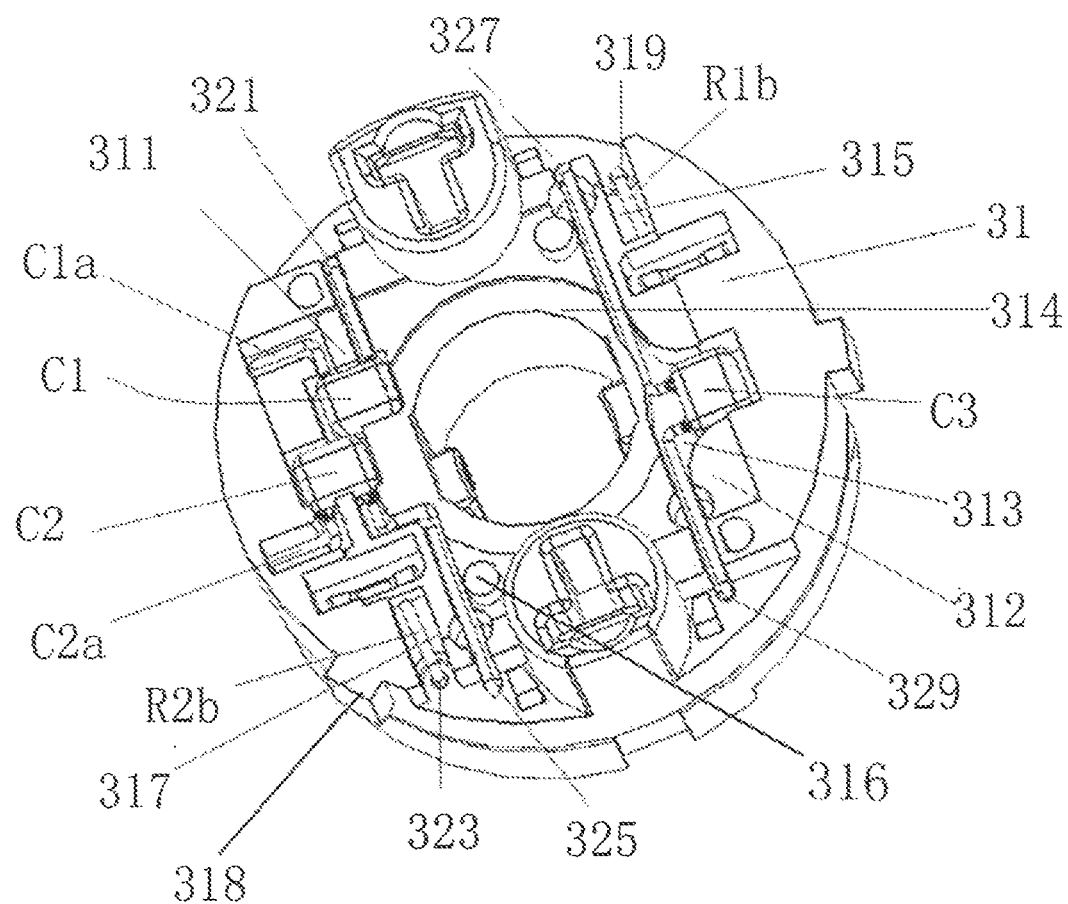
FIG. 5 shows the brush assembly of FIG. 4, viewed from the outer side.

Referring to FIG. 4 and FIG. 5, the brush assembly 3 comprises a terminal holder 31. The circumferential profile of the terminal holder 31 is substantially a columned surface. The diameter of the columned surface is equal to or slightly less than the diameter of the open end of the housing 1, whereby the terminal holder 31 can be received in the open end of the housing 1. A plurality of lugs 318 extends outwardly and radially from the circumference of the terminal holder 31. Each lug 318 is positioned to match a corresponding notch 18 of the housing 1. After the brush assembly 3 is secured with the housing 1, the lugs 318 of the terminal holder 31 are jammed in the notches 18 of the housing to thereby restrict circumferential rotation and axial movement of the brush assembly 3 relative to the housing 1.

Electrical components form part of the brush assembly 3. The electrical components include first and second inductors L1, L2, first and second grounding resistors R1, R2, first and second grounding capacitors C1, C2, and a bridging capacitor C3 connected across positive and negative terminals of the motor. The first and second inductors L1, L2, and the first and second grounding resistors R1, R2 are disposed on a side of the terminal holder 31 facing the interior of the housing 1, i.e., an inner side of the terminal holder 31. The first and second grounding capacitors C1, C2 and the bridging capacitor C3 are positioned on the opposite side of the terminal holder 31 facing the end cap 5, i.e., an outer side of the terminal holder 31. Such arrangement of the electrical components can efficiently utilize the space on both sides of the terminal holder 31 and decrease the radial dimension of the terminal holder 31 and the volume of the motor.

The brush assembly 3 further comprises first and second motor terminals 33, 35 and first and second connectors 37, 39 supported by the terminal holder 31.

Further, the terminal holder 31 is made of an electrically insulating material. Preferably, the terminal holder 31 is made by injection molding a plastic material. The first and second terminals 33, 35 are insert in the terminal holder 31 and are positioned opposite to each other in the radial direction of the terminal holder 31. The first and second terminals 33, 35 are indirectly connected to positive and negative brushes of the motor by the first and second inductors, respectively. The first inductor L1 is electrically connected between the first terminal 33 and the first connector 37. The first connector 37 connects to a first brush 2 of the motor via a lead wire, whereby the first inductor L1 and the first brush 2 are connected in series. The second inductor L2 is electrically connected between the second terminal 35 and the second connector 39. The second connector 39 connects to a second brush 4 of the motor via a lead wire, whereby the second inductor L2 and the second brush 4 are connected in series. The lead wires used to connect the brushes and the connectors are generally termed as brush shunts.

A first receiving portion 311 is defined in the outer side of the terminal holder 31 for matching the configuration and routing of the first and second grounding capacitors C1, C2. A second receiving portion 313 is defined in the outer side of the terminal holder 31 for matching the configuration and routing of the bridging capacitor C3. First and second receiving grooves 315, 317 are defined in the outer side of the terminal holder 31 for matching a corresponding lead of the first and second grounding resistors R1, R2. The bottom surfaces of the first and second receiving portions 311, 313 and first and second receiving grooves 315, 317 are below the outer surface of the terminal holder 31.

One lead R1a of the first grounding resistor R1 connects to one end of the first terminal 33. Another lead R1b of the first grounding resistor R1 is inserted through a first bore 319 of the terminal holder 31 and extends to the outer side of the terminal holder 31, and bends to contact the bottom surface of the first receiving groove 315. The first capacitor C1 is received in the first receiving portion 311. One lead C1a of the first capacitor C1 contacts the bottom surface of the first receiving portion 311. Another lead C1b of the first capacitor C1 is inserted through second bore 321 of the terminal holder 31 and extends to the inner side to connect with the first terminal 33.

One lead R2a of the second grounding resistor R2 connects to the end of the second terminal 35. Another lead R2b of the second grounding resistor R2 is inserted through a third bore 323 of the terminal holder 31 and extends to the outer side of the terminal holder 31, and bends to contact the bottom surface of the second receiving groove 317. The second capacitor C2 is received in the first receiving portion 311. One lead C2a of the second capacitor C2 contacts the bottom surface of the first receiving portion 311. Another lead C2b of the second capacitor C2 is inserted through a fourth bore 325 of the terminal holder 31 and extends to the inner side to connect with the second terminal.

The bridging capacitor C3 is received in the second receiving portion 313. One lead C3a of the bridging capacitor C3 is inserted through a fifth bore 327 of the terminal holder 31 and extends to the inner side to connect with the first terminal 33. Another lead C3b of the bridging capacitor C3 is inserted through a sixth bore 329 of the terminal holder 31 and extends to the inner side to connect with the second terminal 35.

Preferably, the leads C1b, R1a and C3a connect to the first terminal 33 and leads C2b, R2a and C3b connect to the second terminal 35, by a mechanical type connection, such as by being pressed into slots formed in the terminals. Alternatively, the leads may be connected to the terminals by spot welding.

It is noted that, the first and second inductors L1, L2, the first and second grounding resistors R1, R2, the first and second grounding capacitors C1, C2 and the bridging capacitor C3 can withstand a wide range of temperatures from −40° C. to 150° C. The capacitors C1, C2, C3 form a filter circuit to reduce electrical noise (EMI).

A third receiving portion 312 is defined in the outer side of the terminal holder 31 for receiving the plate 7. The bottom surface of the third receiving portion 312 is disposed beneath the surface of the outer side of the terminal holder 31 and above the bottom surfaces of the first and second receiving portions 311, 313 and the first and second receiving grooves 315, 317. Preferably, the depth of the third receiving portion 312 is substantially equal to the thickness of the plate 7 for fittingly receiving the plate 7 therein. Alternatively, the depth of the third receiving portion 312 can be slightly greater or less than the thickness of the plate 7. A first recess portion 314 having an approximately annular shape is defined in the center of the third receiving portion 312. Two positioning posts 316 are formed on the surface of the outer side of the terminal holder 31 for positioning the plate 7 and the end cap 5.

Figure 6:
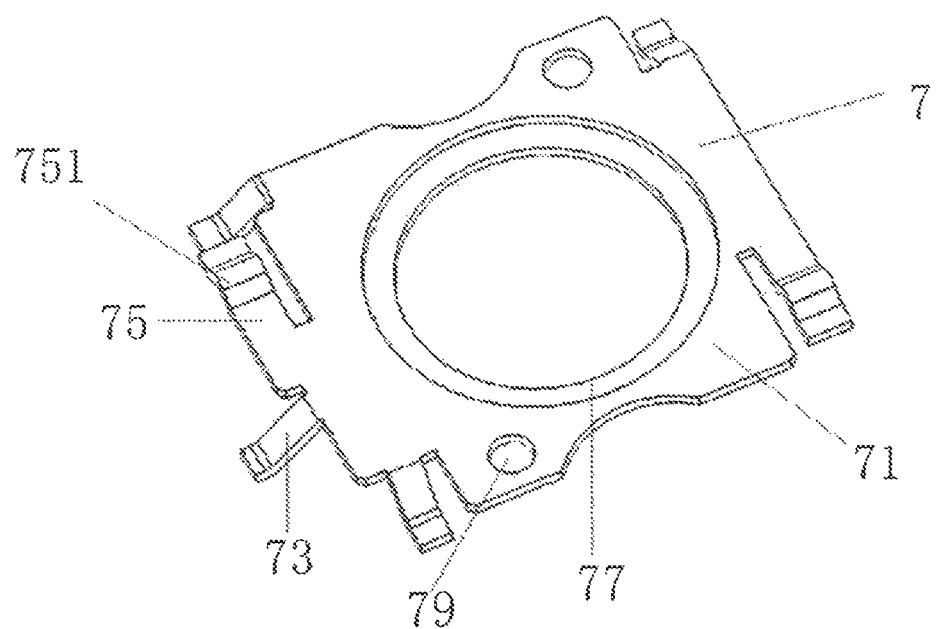
FIG. 6 shows a ground plate forming a major component of a ground connection structure of the motor.
Figure 7:
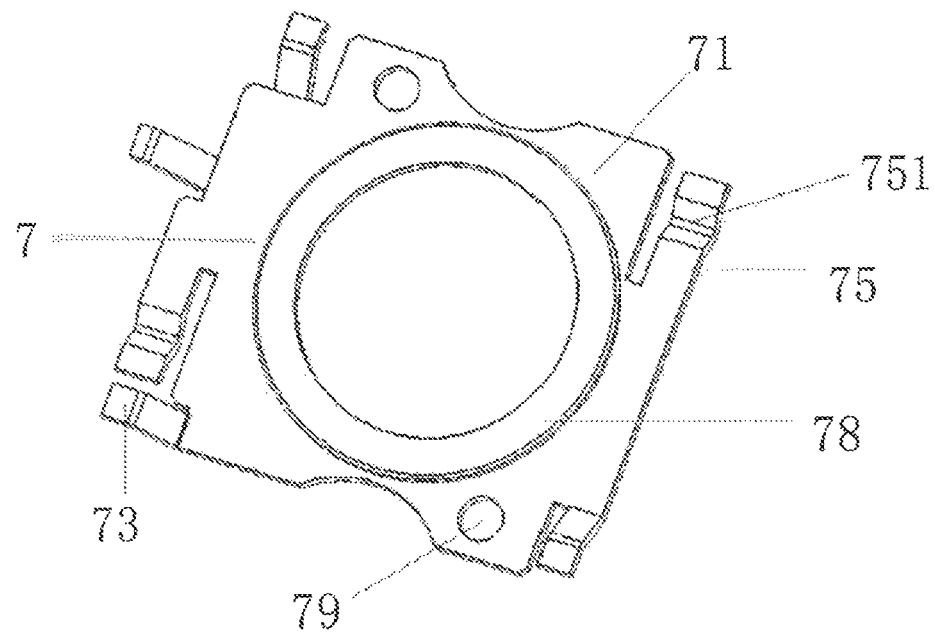
FIG. 7 shows the ground plate of FIG. 6, viewed from a different aspect.
Figure 8:
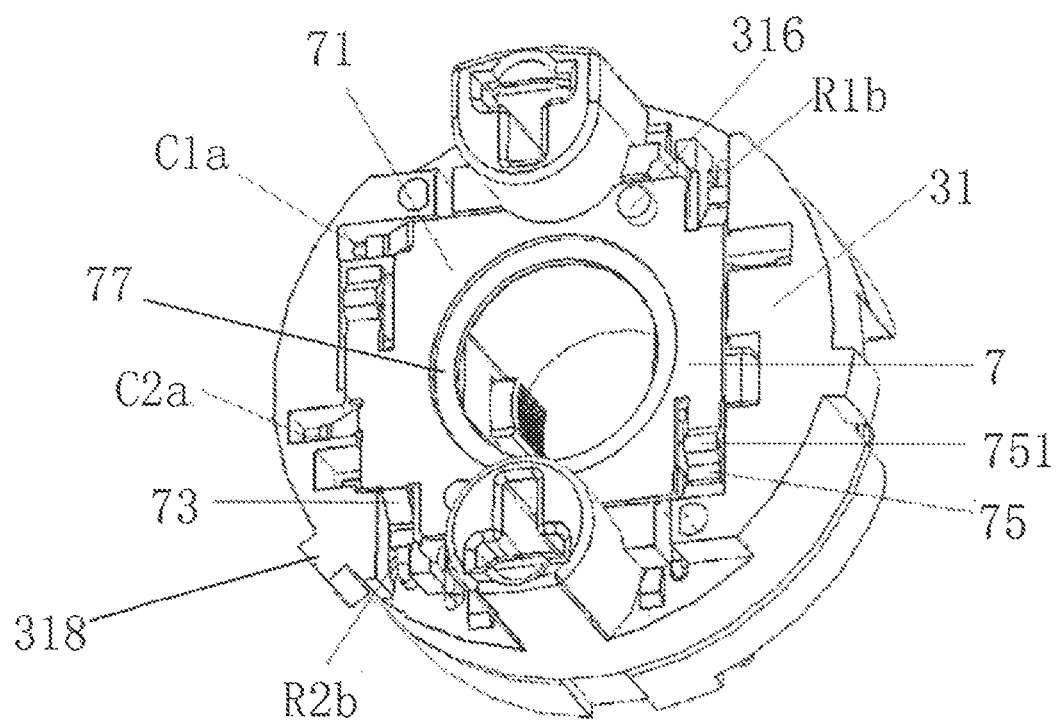
FIG. 8 shows the ground plate assembled to the outer side of the brush assembly.

Referring to FIGS. 6, 7 and 8, the plate 7 is made of an electrically conductive material such as metal. The plate 7 comprises a main body 71, a plurality of claws 73 extending from the main body 71 and at least one tongue 75 extending from the main body 71. The claws 73 and the tongue 75 are configured as cantilevers extending from the main body 71 to form resiliently deformable structures. Each claw is elongated and extends obliquely downwards from the terminal holder 31 to the free end. Each tongue 75 is elongated, and an invert V shaped or invert U shaped bent portion 751 is formed at the middle portion, protruding away from the terminal holder 31. The top of the bent portion 751 protrudes above the surface of the outer side of the terminal holder 31. The plate 7 further forms an annular first bulge 78 at the center of the inner side of the main body 71 with a corresponding annular second recess portion 77 formed in the outer side. Two first positioning holes 79 are defined in the main body 71 for receiving the positioning posts 316 of the terminal holder. Preferably, the first positioning holes 79 are round. In the present embodiment, the number of the claws is four, and is equal to the number of the leads of the electrical components which are connected to ground. In the present embodiment, the number of the tongues 75 is two. Understandably, the number of claws 73 and tongues 75 can be varied as desired.

As shown in FIG. 8, when fitted to the terminal holder, the plate 7 is received in the third receiving portion 312. The free ends of the four claws 73 respectively rest on the lead R1b of the first grounding resistor R1, the lead R2b of the second grounding resistor R2, the lead C1a of the first grounding capacitor C1, and the lead C2a of the second grounding capacitor C2, which are positioned in the corresponding receiving portions or receiving grooves of the terminal holder 31. The first bulge 78 is received in the first recess portion 314 of the terminal holder.

Figure 9:
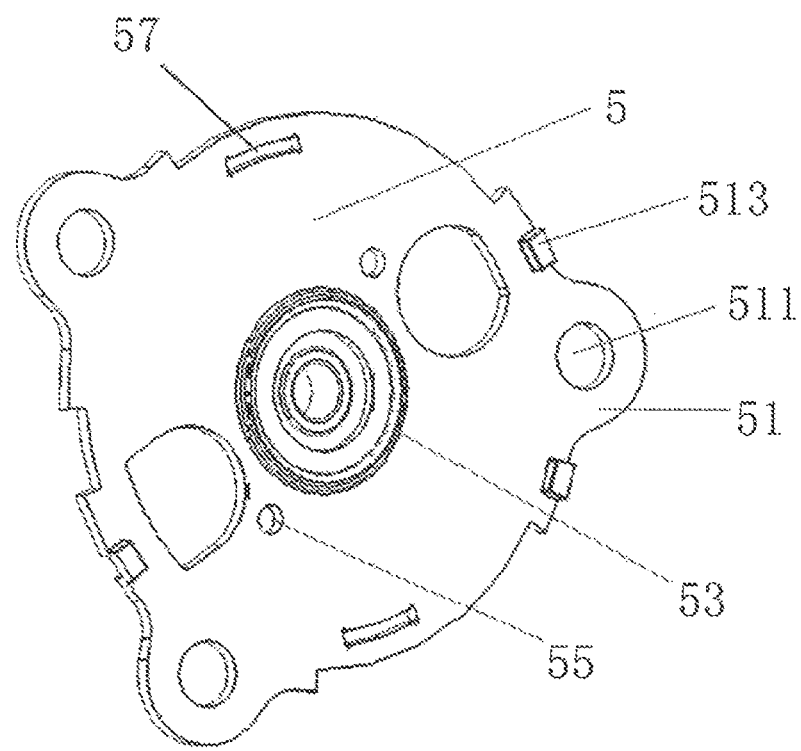
FIG. 9 shows an end cap, being a part of the motor of FIG. 2.

Referring to FIG. 9, a second support portion 51 is formed on the end cap 5 corresponding to the first support portion 11 of the housing 1. The first and second support portions 11, 51 have the same configuration. A second through hole 511 is defined in the second support portion corresponding to the first through hole 111 of the first support portion. The end cap 5 has the mortises 57 corresponding to the tenons 17 of the housing 1, and the protrusions 513 corresponding to the openings 113 of the housing 1. An annular second bulge 53 is formed on the end cap 5 corresponding to the second recess portion 77 of the plate 7. Two second positioning holes 55 are defined in the end cap 5 corresponding to the two positioning posts 316 of the terminal holder 31. Preferably, the second positioning holes 55 are round.

Figure 10:
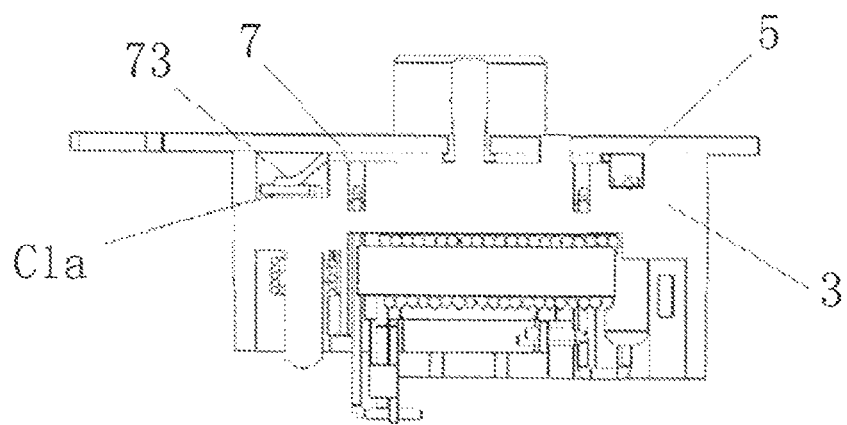
FIG. 10 is a sectional view of an end cap assembly of the motor.
Figure 11:
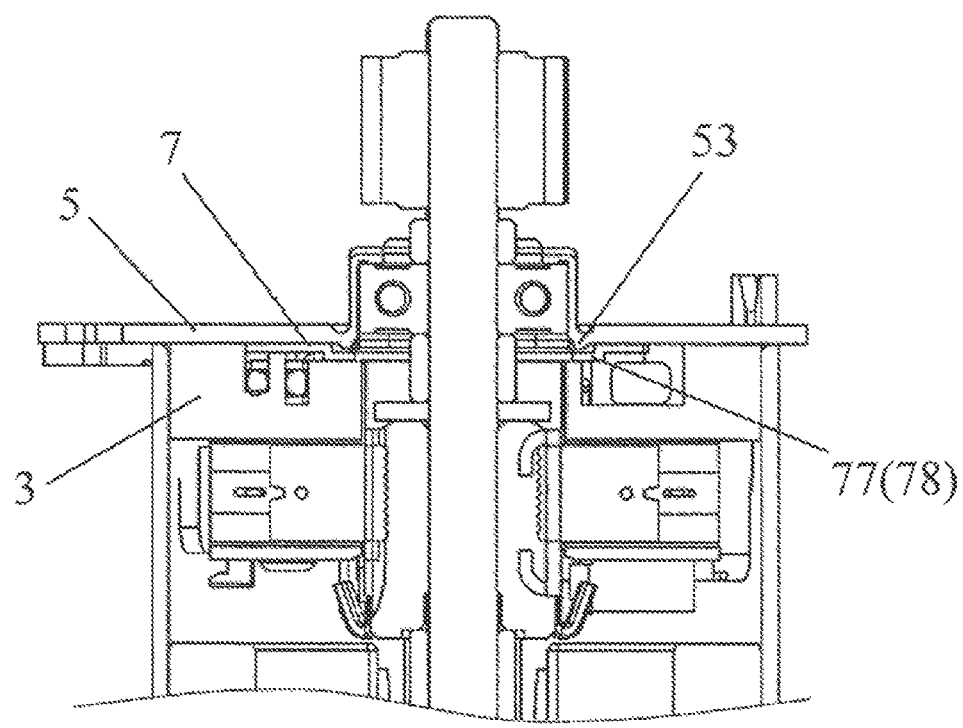
FIG. 11 is another sectional view of the end cap assembly.

Referring also to FIGS. 10 and 11, in assembly, the brush assembly 3 is installed in the open end of the housing, such that the lugs 318 of the terminal holder 31 are jammed in the notches 18 of the housing 1, the first bulge 78 and first positioning holes 79 are respectively aligned with the first recess portion 314 and positioning posts 316 of the terminal holder 31, and the plate 7 is received in the third receiving portion 312 of the terminal holder 31, with the claws 73 of the plate 7 respectively contacting the lead R1b of the first grounding resistor R1, the lead R2b of the second grounding resistor R2, the lead C1a of the first grounding capacitor C1 and the lead C2a of the second grounding capacitor C2. The end cap 5 is then positioned to close the open end of the housing, and the protrusions 513 are placed in the openings 113 of the housing 1 to achieve the accurate positioning of the end cap 5 and the housing 1. At the same time, the tenons 17 of the housing 1 are inserted through the mortises 57 of the end cap 5, the second bulge 53 is aligned with and received in the second recess portion 77 of the plate 7, and the positioning posts 316 of the terminal holder 31 are inserted through the second positioning holes 55 of the end cap 5. The tenons 17 are deformed outwardly after inserting through the mortises 57 to fix the end cap 5 to the housing 1. The second support portion 51 of the end cap 5 and the first support portion 11 of the housing 1 are aligned to allow fasteners such as bolts to be inserted through the first and second through holes 111, 511 to mount the motor to a device or appliance.

After assembly, the end cap 5 rests on the bent portion 751 of the tongues 75, which protrudes above the surface of the terminal holder 31. The plate 7 is pressed between the terminal holder and the end cap, whereby the claws 73 resiliently bear against the lead R1b of the first grounding resistor R1, the lead R2b of the second grounding resistor R2, the lead C1a of the first grounding capacitor C1, and the lead C2a of the second grounding capacitor C2, respectively, and the tongues bear against the end cap, to establish a reliable electrical ground connection with the end cap 5.

Figure 12:
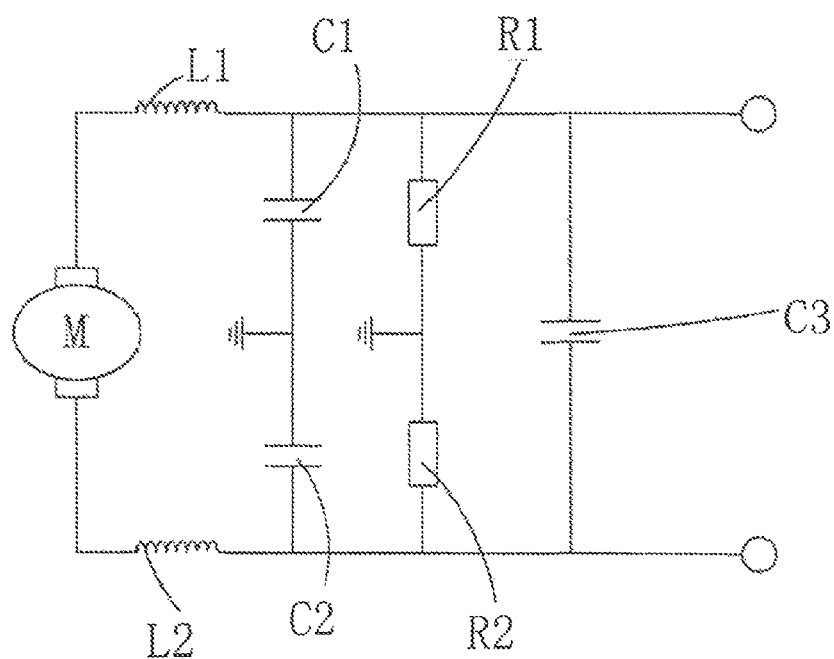
FIG. 12 is a schematic circuit diagram of the motor of FIG. 2.

FIG. 12 shows the schematic circuit diagram of the ground connection. The first and second inductors L1, L2 are connected between the positive and negative brushes and the terminals of the motor. The first inductor L1 connects to each of the first grounding resistor R1 and the first grounding capacitor C1 to establish a ground connection. The second inductor L2 connects to each of the second grounding resistor R2 and the second grounding capacitor C2 to establish a ground connection. The bridging capacitor C3 is connected between the positive and negative terminals of the motor. The first and second grounding capacitors C1, C2 can filter common mode EMI. The bridging capacitor C3 can filter differential mode EMI. Thus, EMI can be effectively suppressed, and a high EMC can be obtained. The reliable fixation between the end cap 5 and the housing 1 ensures that the plate 7 is constantly being resiliently pressed, which is beneficial for the reliable connection between the claws 73 and the corresponding leads of the electrical components and for achieving high vibration resistance.

Figure 13:
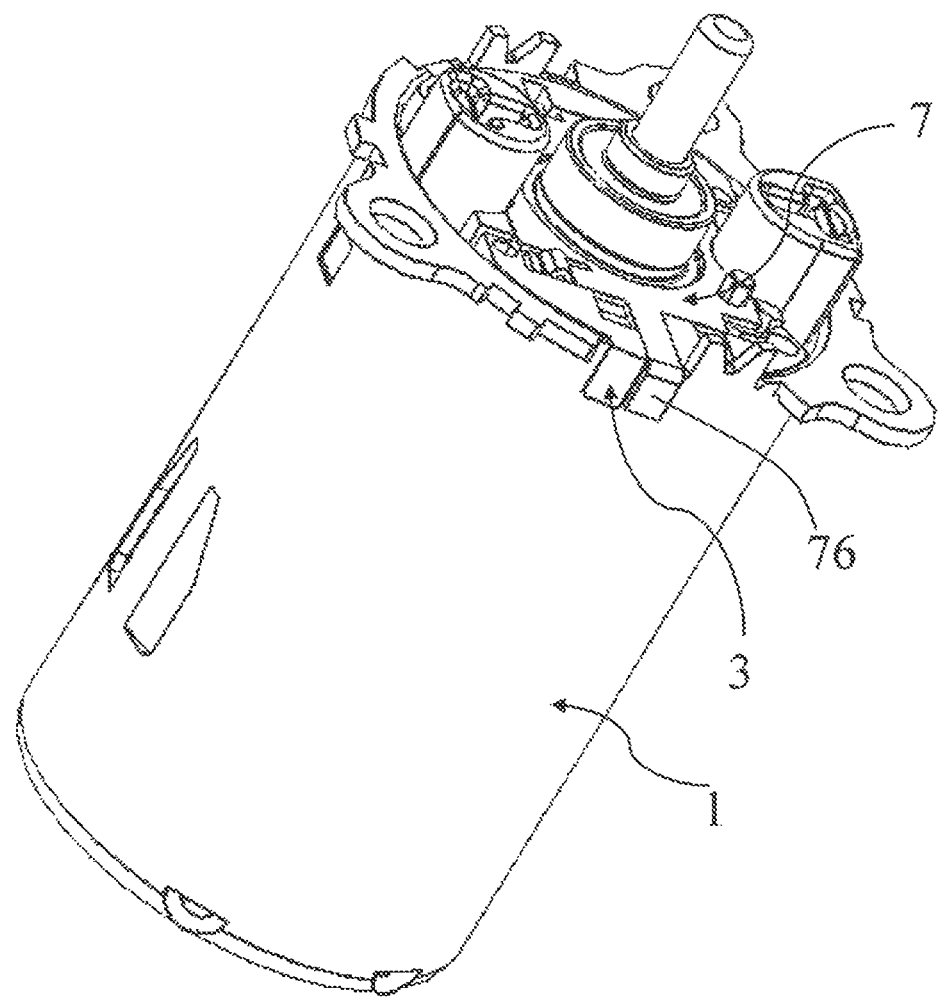
FIG. 13 is an assembled view of a motor according to a second embodiment, with the end cap removed.
Figure 14:
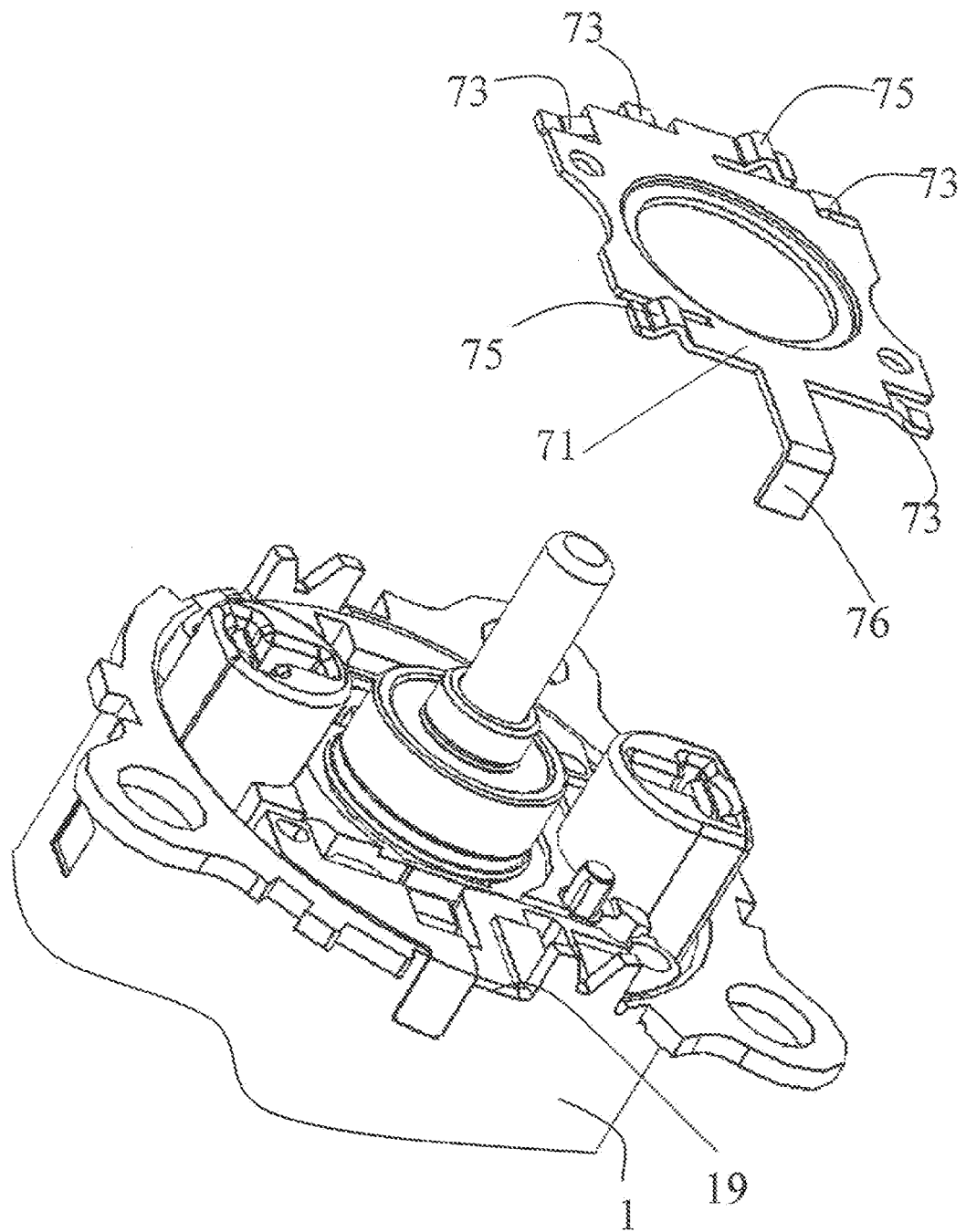
FIG. 14 is a partially exploded view of the motor of FIG. 13, showing the ground plate spaced from the brush assembly and with the end cap omitted.

FIG. 13 and FIG. 14 show a motor having an end cap assembly with a ground connection according to another embodiment of the present invention. The main difference between the motor in the present embodiment and the motor in the previous embodiment is that the plate 7 further comprises an extending foot 76. The foot 76 is preferably elongated, extending from the main body 71 to a free end extending beyond the open end of the housing 1 and bent to electrically connect the housing 1 to further ensure the ground connection. Specifically, a depression 19 is defined in the periphery of the open end of the housing. The depth of the depression 19 is preferably equal to the thickness of the extending foot 76. The foot 76 extends through the depression 19 and bends in a direction away from the end cap to contact the outer circumferential surface of the housing 1. The foot 76 contacting the housing 1 further ensures the ground connection. In this embodiment, the foot 76 is connected to both the end cap and the housing. Thus, even if the end cap is made of a non-conductive material, the structure provided in the present embodiment can still accomplish the ground connection by the foot 76 being in direct electrically contact with the housing of the motor. As such, the plate 7 provided in the present embodiment can be utilized in motors with or without a conductive end cap.

Understandably, the foot 76 can be arranged so as to not extend beyond the housing 1 and is bent to contact an inner surface of the housing 1. Such a configuration can also achieve the electrical connection between the foot 76 and the housing 1. If there is enough space in the terminal holder 3, the foot 76 can extend obliquely and inwardly, and then bend outward (toward the end cap 5) to form a resilient bending portion. The bending portion contacts and electrically connects to the inner surface of the housing.

By using the two grounding capacitors and bridging capacitor between the positive and negative terminals of the motor, the motor having grounding connection structure provided in the present invention can effectively suppress EMI and obtain a high EMC. The plate having resilient structures can withstand being compressed after the end cap is secured onto the housing, thus ensuring the reliable connection between the claws of the plate and the corresponding leads of the electrical components, whereby the stable ground connection is accomplished by the end cap under high temperature and dramatic vibration environment.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. An electric motor, comprising:
a housing having an open end; and
an end cap assembly closing the open end of the housing, the end cap assembly comprising:
a brush assembly comprising a terminal holder and electrical components disposed on the terminal holder;
an end cap positioned on an outer side of the terminal holder and secured to the housing; and
a ground plate installed between the terminal holder and the end cap, the plate being electrically connected to at least one of the housing and the end cap and comprising at least one resiliently deformable structure bearing against a lead of at least one of the electrical components to electrically connect said lead to the housing or end cap.

2. The motor of claim 1, wherein the plate comprises a main body and a plurality of claws extending from the main body, the claws being configured as the resiliently deformable structures, each claw has one end connected to the main body, and an opposite free end extending obliquely away from the end cap, which elastically bears against the corresponding lead of the respective electrical component.

3. The motor of claim 2, wherein the plate further comprises at least one tongue, at least part of the tongue protrudes away from the terminal holder to form a bent portion, the bent portion protruding beyond the surface of the terminal holder to resiliently bear against the end cap.

4. The motor of claim 3, wherein the bent portion is configured to have an inverted V shape or inverted U shape.

5. The motor of claim 2, wherein the plate further comprises an foot extending from the main body, with a free end bent to electrically connect to the housing.

6. The motor of claim 1, wherein the plate electrically connects to the end cap, and the electrical components comprise at least one inductor and at least one grounding resistor or capacitor.

7. The motor of claim 6, wherein the electrical components comprise first and second inductors, first and second grounding resistors, first and second grounding capacitors, and a bridging capacitor, the bridging capacitor being connected across positive and negative terminals of the motor, the resiliently deformable structures respectively bearing against corresponding ground leads of the first and second grounding resistors and the first and second grounding capacitors.

8. The motor of claim 7, wherein first and second connectors are disposed in the terminal holder, the first and second inductors and grounding resistors being positioned on an inner side of the terminal holder facing the housing, the first and second grounding capacitors and the bridging capacitor being positioned on an outer side of the terminal holder facing the end cap.

9. The motor of claim 8, wherein a first receiving portion is defined in the outer side of the terminal holder for matching the configuration and routing of the first and second grounding capacitors, a second receiving portion is defined in the outer side of the terminal holder for accommodating the bridging capacitor, and first and second receiving grooves are defined in the outer side of the terminal holder for accommodating corresponding leads of the first and second grounding resistors; and wherein the first and second grounding capacitors are received in the first receiving portion, and the bridging capacitor is received in the second receiving portion.

10. The motor of claim 9, wherein one lead of the first grounding resistor connects to the first terminal, a second lead is inserted through the terminal holder and extends to the outer side of the terminal holder to contact the bottom surface of the first receiving groove; wherein one lead of the first grounding capacitor contacts the bottom surface of the first receiving portion, a second lead is inserted through the terminal holder and extends to the inner side of the terminal holder to connect to the first terminal; wherein one lead of the second grounding resistor connects to the second terminal, and a second lead is inserted through the terminal holder and extends to the outer side of the terminal holder and bends to contact the bottom surface of the second receiving groove; wherein one lead of the second grounding capacitor contacts the bottom surface of the first receiving portion, and a second lead is inserted through the terminal holder and extends to the inner side of the terminal holder to connect with the second terminal; and wherein one lead of the bridging capacitor is inserted through the terminal holder and extends to connect to the first terminal, and a second lead of the bridging capacitor is inserted through the terminal holder and extends to connect to the second terminal.

11. The motor of claim 1, wherein a receiving portion is defined in the terminal holder, in which the plate is received.

12. The motor of claim 11, wherein positioning posts are formed in the terminal holder, and corresponding first positioning holes are defined in the plate, the positioning posts being inserted through the first positioning holes.

13. The motor of claim 12, wherein a first bulge is formed at the center of the plate facing the terminal holder, and a first recess portion is defined in the terminal holder for receiving the first bulge.

14. The motor of claim 13, wherein a second recess portion is defined in the plate corresponding to the first bulge, a second bulge is formed on the end cap corresponding to the second recess portion, and second positioning holes are defined in the end cap corresponding to the positioning posts of the terminal holder; and wherein the second bulge is aligned with and received in the second recess portion of the plate, and the positioning posts of the terminal holder are disposed in the second positioning holes of the end cap, respectively.

15. The motor of claim 1, wherein notches are defined in the open end of the housing, and corresponding lugs are formed on the terminal holder, the lugs being disposed in the notches.

16. The motor of claim 1, wherein a plurality of tenons extends axially from the open end of the housing, and a plurality of mortises is defined in the end cap corresponding to the tenons of the housing, the tenons extend through the mortises and are deformed to fix the end cap to the housing.

17. The motor of claim 1, wherein a plurality of first support portions extends radially outwards from a circumferential periphery of the open end of the housing, a first through hole is defined in the center of each first support portion, a plurality of second support portions is formed on the end cap corresponding to the first support portion, and a second through hole is defined in each second support portion corresponding to the first through hole for receiving a fastener to secure the motor to a device.

18. The motor of claim 17, wherein a plurality of openings is defined in the first support portion, and a plurality of protrusions is formed on the end cap, the protrusions being disposed in the openings to position the end cap relative to the housing.

* * * * *